(12) United States Patent
Ueno

(10) Patent No.: US 7,242,844 B1
(45) Date of Patent: Jul. 10, 2007

(54) VIDEO SIGNAL RECORDING AND REPRODUCTION DEVICE AND VIDEO SIGNAL REPRODUCTION DEVICE

(75) Inventor: Masaji Ueno, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/446,790
(22) PCT Filed: Jun. 26, 1998
(86) PCT No.: PCT/JP98/02882
§ 371 (c)(1),
(2), (4) Date: Mar. 20, 2000
(87) PCT Pub. No.: WO99/00992
PCT Pub. Date: Jan. 7, 1999

(30) Foreign Application Priority Data
Jun. 27, 1997 (JP) ............................................ 9-171399

(51) Int. Cl.
*H04N 9/00* (2006.01)

(52) U.S. Cl. .............................. 386/1; 386/44; 348/705
(58) Field of Classification Search ..................... 386/1, 386/34, 26, 44; 348/642, 659, 663, 705, 706; 358/906, 909.1
See application file for complete search history.

(56) References Cited

U.S. PATENT DOCUMENTS

| | | | | |
|---|---|---|---|---|
| 4,884,151 A | * | 11/1989 | Ohtsu et al. ................. | 386/26 |
| 5,200,834 A | * | 4/1993 | Iwaibana et al. ............. | 386/26 |
| 5,774,190 A | * | 6/1998 | Marumoto et al. ......... | 348/705 |
| 5,909,532 A | * | 6/1999 | Kanota et al. ............... | 386/26 |
| 6,091,880 A | * | 7/2000 | Hatae et al. .................. | 386/44 |

FOREIGN PATENT DOCUMENTS

| | | |
|---|---|---|
| EP | 0630161 | 12/1994 |
| EP | 0703715 | 3/1996 |
| JP | 63-269894 | 11/1988 |
| JP | 3-77569 | 8/1991 |
| JP | 5-199543 | 8/1993 |
| JP | 6-46453 | 2/1994 |

OTHER PUBLICATIONS

Supplementary European Search Report dated Nov. 19, 2002 for EP 98929720.

* cited by examiner

*Primary Examiner*—Thai Q. Tran
*Assistant Examiner*—Christopher Onuaku
(74) *Attorney, Agent, or Firm*—RatnerPrestia

(57) ABSTRACT

A video signal recording and reproduction device of this invention uses one of a plurality of terminals for receiving input of component video signal to also serve as a composite video signal input terminal, thereby reducing a number of the input terminals. This realizes a reduction in size of the device, yet maintains the device to be capable of receiving both inputs of component video signal and composite video signal. The video signal recording and reproduction device of this invention also uses one of a plurality of terminals for outputting component video signal to also serve as a composite video signal output terminal, thereby reducing a number of the output terminals. This realizes a further reduction in size of the device, yet maintains the device to be capable of providing both outputs of component video signal and composite video signal.

6 Claims, 14 Drawing Sheets

VIDEO SIGNAL RECORDING AND REPRODUCTION DEVICE AND VIDEO SIGNAL REPRODUCTION DEVICE

This Application is a U.S. National Phase Application of PCT International Application PCT/JP98/02882.

FIELD OF THE INVENTION

The present invention relates to a video signal recording and reproduction device and a video signal reproduction device that processes component video signals and composite video signals.

BACKGROUND OF THE INVENTION

A video signal recording and reproduction device and a video signal reproduction device (hereinafter referred to as "video device") of the prior art capable of handling an input and an output of two types of video signals, i.e. component video signal and composite video signal, are provided with a total of eight input and output terminals. There are three input terminals for the component video signal, one input terminal for the composite video signal, three output terminals for the component video signal, and one output terminal for the composite video signal.

Referring to a block diagram of a video device of the prior art in FIG. 13, described hereinafter will pertain to switching of an input signal. A composite video signal "CV" input to a composite video signal input terminal 131 is separated into a luminance signal "Y" and a carrier color signal "C" by a YC separation circuit 135. A luminance signal input terminal 156 receives an input of component luminance signal. A first switching device 137 receives the luminance signal, which is input through the luminance signal input terminal 156, at an "A" terminal, and the luminance signal output "Y", which is output by the YC separation circuit 135, at a "B" terminal. The first switching device 137 then produces an output by selecting either of the "A" terminal and the "B" terminal. A B-Y signal input terminal 132 receives an input of color difference signal, or a B-Y signal, and an R-Y signal input terminal 133 receives an input of color difference signal, or an R-Y signal. A color difference decoder circuit 136 converts the carrier color signal output "C" produced by the YC separation circuit 135 into two color difference signals, i.e. an R-Y signal and a B-Y signal. A second switching device 138 receives the B-Y signal, which is output by the color difference decoder circuit 136, at a "B" terminal, and the component B-Y signal, which is input through the B-Y signal input terminal 132, at an "A" terminal. The second switching device 138 then produces an output by selecting either of the "A" terminal and the "B" terminal. A third switching device 139 receives the R-Y signal, which is output by the color difference decoder circuit 136, at a "B" terminal, and the component R-Y signal, which is input to the R-Y signal input terminal 133, at an "A" terminal. The third switching device 139 then produces an output by selecting either of the "A" terminal and the "B" terminal. An input signal switching control circuit 134 controls the switching devices 137 through 139. A video signal recording circuit 140 records the signals that are output by the individual switching devices into a recording medium.

The video signal recording and reproduction device of the prior art operates in a manner, which will be described hereinafter by referring to FIG. 13. A component video signal includes a component luminance signal, a component B-Y signal, and a component R-Y signal.

When the component video signal is input to the video signal recording and reproduction device, the component luminance signal "Y" is input to the luminance signal input terminal 156, the component B-Y signal is input to the B-Y signal input terminal 132, and the component R-Y signal is input to the R-Y signal input terminal 133 respectively.

The input signal switching control circuit 134 is operated to select inputs at "A" sides of the input terminals of the switching devices 137 through 139. The selected component luminance signal, the component B-Y signal and the component R-Y signal are output to the video signal recording circuit 140, and individual signals are recorded in the recording medium.

When composite video signal is input to the video recording and reproduction device, the composite video signal "CV" is connected to the composite video signal input terminal 131.

The input signal switching control circuit 134 is operated to select inputs at "B" sides of the input terminals of the switching devices 137 through 139. The luminance signal "Y" separated by the YC separation circuit 135 from the composite video signal "CV", and the B-Y signal and the R-Y signal converted by the color difference decoder circuit 136 are output to the video signal recording circuit 140, and these signals are recorded in the recording medium.

With reference to a block diagram of a video device of the prior art in FIG. 14, the description next pertains to switching of an output signal. A luminance signal reproduction circuit 142 reproduces the luminance signal "Y" from the recording medium. A B-Y signal reproduction circuit 147 reproduces the B-Y signal from the recording medium. An R-Y signal reproduction circuit 148 reproduces the R-Y signal from the recording medium. A color signal encoder circuit 146 converts the B-Y signal and the R-Y signal output respectively by the B-Y signal reproduction circuit 147 and the R-Y signal reproduction circuit 148 into a carrier color signal "C". An adder circuit 143 produces and outputs a composite video signal "CV" by adding the luminance signal output by the luminance signal reproduction circuit 142 and the carrier color signal "C" output by the color signal encoder circuit 146. A first output amplifier circuit 145 amplifies an output of the adder circuit 143, and outputs it to a composite video signal output terminal 151. A second output amplifier circuit 149 amplifies an output signal of the B-Y signal reproduction circuit 147, and outputs it to a B-Y signal output terminal 152. A third output amplifier circuit 150 amplifies an output signal of the R-Y signal reproduction circuit 148, and outputs it to an R-Y signal output terminal 153. A fourth output amplifier circuit 154 amplifies a luminance signal output of the luminance signal reproduction circuit 142, and outputs it to a luminance signal output terminal 155.

Referring to FIG. 14, the video signal recording and reproduction device of the prior art operates in a manner as described hereinafter. First, an operation of the video signal recording and reproduction device to output a component video signal will be described as follows.

The luminance signal "Y" reproduced by the luminance signal reproduction circuit 142 is amplified by the fourth output amplifier circuit 154, and it is output from the luminance signal output terminal 155 as a component luminance signal. The B-Y signal reproduced by the B-Y signal reproduction circuit 147 is amplified by the second output amplifier circuit 149, and it is output from the B-Y signal output terminal 152 as a component B-Y signal. In the same manner, the R-Y signal reproduced by the R-Y signal reproduction circuit 148 is output from the R-Y signal output terminal 153 as a component R-Y signal.

Next, an operation of the video signal recording and reproduction device to output a composite video signal will be described.

The color signal encoder circuit 146 receives the B-Y signal output from the B-Y signal reproduction circuit 147 and the R-Y signal output from the R-Y signal reproduction circuit 148, and converts these input signals into a carrier color signal "C". The adder circuit 143 adds the carrier color signal "C" and the luminance signal "Y" reproduced by the luminance signal reproduction circuit 142. The added signal is amplified by the first output amplifier circuit 145, and is output from the composite video signal output terminal 151 as the composite video signal.

As described above, the video signal recording and reproduction device of the prior art has typically been equipped with a total of eight input and output terminals, i.e. three input terminals for the component video signal, one input terminal for the composite video signal, three output terminals for the component video signal, and one output terminal for the composite video signal, in order to input and output both the component video signal and the composite video signal.

Therefore, the video signal recording and reproduction device may have held a large space needed for installation of these input and output terminals, thereby restraining the video signal recording and reproduction device from being reduced in size. The video signal recording and reproduction device has also included eight sets of signal cable connecting with each of the input and output terminals, which may restrict usable space within the device.

In addition, the video signal recording and reproduction device has desirably included an output amplifier circuit for each of the output terminals, giving rise to a problem that a scale of the circuitry is inevitably large, and therefore consuming a large electric power.

In recent years, a need arises for lessening the input and output terminals, and reducing the power consumption, since a demand exists for video signal recording and reproduction devices that are usable outdoors, small in size, and easy to carry.

SUMMARY OF THE INVENTION

A video signal recording and reproduction device makes use of one terminal out of a plurality of terminals for inputting component video signal to also serve as an input terminal for composite video signal, thereby the video signal recording and reproduction device is capable of inputting both the component video signal and the composite video signal.

Furthermore, the video signal recording and reproduction device also makes use of one terminal out of a plurality of terminals for outputting component video signal to also serve as an output terminal for composite video signal, thereby the video signal recording and reproduction device is capable of outputting both the component video signal and the composite video signal.

Moreover, the video signal recording and reproduction device makes use of one terminal out of the plurality of terminals for inputting component video signal to serve commonly as an input terminal for composite video signal, and also another one terminal out of the plurality of terminals for outputting component video signal to serve commonly as an output terminal for composite video signal. This makes the video signal recording and reproduction device capable of inputting and outputting both the component video signal and the composite video signal.

DESCRIPTION OF THE PREFERRED EMBODIMENTS

First Exemplary Embodiment

Figure 1:
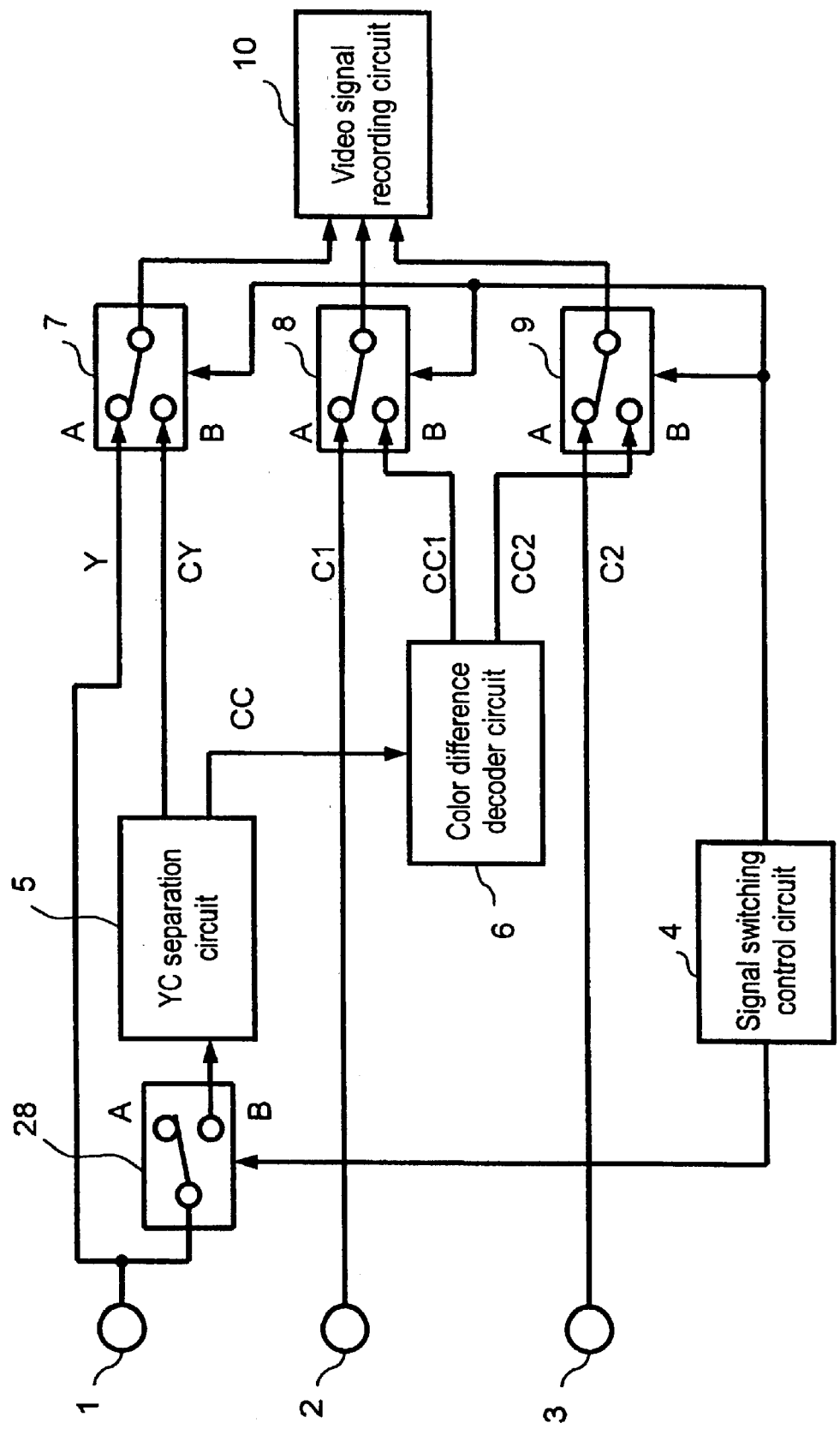
FIG. 1 is a block diagram depicting a video signal recording and reproduction device of a first exemplary embodiment of the present invention.

A video signal recording and reproduction device of a first exemplary embodiment of the preset invention will be described hereinafter by referring to a block diagram of FIG. 1.

The video signal recording and reproduction device of this exemplary embodiment is equipped with three input terminals to input video signals, i.e. a first signal input terminal 1, a second signal input terminal 2, and a third signal input terminal 3.

A YC separation circuit 5 separates a composite video signal into a luminance signal "CY" and a carrier color signal "CC", when it is input with the composite video signal. A luminance signal "Y" input to the first signal input terminal 1 is fed to an "A" terminal of a first switching device 7, and the luminance signal "CY" output by the YC separation circuit 5 is fed to a "B" terminal. A color difference decoder circuit 6 converts the carrier color signal output "CC", which is output by the YC separation circuit 5, into two color difference signals, a first color difference signal "CC1" and a second color difference signal "CC2". The first color difference signal "CC1" output by the color difference decoder circuit 6 is fed to a "B" terminal of a second switching device 8, and another first color difference signal "C1" input to the second signal input terminal 2 is fed to an "A" terminal of the second switching device 8. The second switching device 8 selects either one of the "C1" and the "CC1", and outputs it to a video signal recording circuit 10. The second color difference signal "CC2" output by the color difference decoder circuit 6 is fed to a "B" terminal of a third switching device 9, and another second color difference signal "C2" input to the third signal input terminal 3 is fed to an "A" terminal of the third switching device 9. The third switching device 9 selects either one of the "C2" and the "CC2", and outputs it to the video signal recording circuit 10. An input signal switching device 28 selects whether it outputs a signal fed in the first signal input terminal 1 to the YC separation circuit 5 or not. The video signal recording circuit 10 records the signals output from the first, the second and the third switching devices into a recording medium. A signal switching control circuit 4 controls the switching devices 7 through 9 and 28.

In the video signal recording and reproduction device of this exemplary embodiment, if the input video signal is a component video signal, the device inputs a component luminance signal "Y" to the first signal input terminal 1, a first component color difference signal "C1" (e.g. B-Y signal, U signal, I signal, and so on) to the second signal input terminal, and a second component color difference signal "C2" (e.g. R-Y signal, V signal, Q signal, and so on) to the third signal input terminal 3.

If the video signal input to it is a composite video signal, the device inputs the composite video signal into the first signal input terminal 1, but it does not input any signal to the second signal input terminal 2 and the third signal input terminal 3.

Described first is a case in which the device records the component video signal. The first signal input terminal 1, the second signal input terminal 2 and the third signal input terminal 3 are respectively input with the component luminance signal "Y", the first component color difference signal "C1" and the second component color difference signal "C2".

The signal switching control circuit 4 is operated to select input signals on the "A" side input terminals of the first through the third switching devices 7 through 9, and the "A" side output terminal of the input signal switching device 28. An output of the input signal switching device 28 is open, because no connection is provided with the "A" side output terminal of the input signal switching device 28.

The first switching device 7, the second switching device 8 and the third switching device 9 output the component luminance signal "Y" input through the first signal input terminal 1, the first component color difference signal "C1" input through the second signal input terminal 2 and the second component color difference signal "C2" input through the third signal input terminal 3 respectively to the video signal recording circuit 10. The video signal recording circuit 10 receives the component luminance signal "Y", the first component color difference signal "C1" and the second component color difference signal "C2", and records these signals in the recording medium.

Described next is a case in which the device records a composite video signal. The first signal input terminal 1 is input with the composite video signal, and the signal switching control circuit 4 is operated to select input signals on the "B" side input terminals of the first through the third switching devices 7 through 9, and an output signal on the "B" side output terminal of the input signal switching device 28.

A common terminal of the input signal switching device 28 is connected to the first signal input terminal 1. The composite video signal input to the first signal input terminal 1 is fed to the YC separation circuit 5 through the input signal switching device 28, and separated into a luminance signal "CY" and a carrier color signal "CC". The separated luminance signal "CY" is forwarded to the "B" side terminal of the first switching device 7. The separated carrier color signal "CC" is converted into a first color difference signal "CC1" and a second color difference signal "CC2" in the color difference decoder circuit 6. The first color difference signal "CC1" is output to the "B" side terminal of the second switching device 8, and the second color difference signal "CC2" is output to the "B" side terminal of the third switching device 9.

In the manner as described, the video signal recording circuit 10 receives the luminance signal "CY" output by the YC separation circuit 5, and the first color difference signal "CC1" and the second color difference signal "CC2" output by the color difference decoder circuit 6, and records the signals into the recording medium.

As has been described, the video signal recording and reproduction device of this exemplary embodiment desirably may need only three input terminals. Thus, the device is able to receive the video signal with a smaller number of the input terminals as compared to the four terminals needed by the conventional device, so as to provide an advantage of reducing a number of signal cables within the device.

Second Exemplary Embodiment

A video signal recording and reproduction device of a second exemplary embodiment of the present invention will be described hereinafter by referring to a block diagram of FIG. 2.

The video signal recording and reproduction device of this exemplary embodiment is provided with the same structural elements as that of the first exemplary embodiment shown in FIG. 1. It differs in a respect that the common terminal of the input signal switching device 28 is connected to the second signal input terminal 2 in FIG. 2, whereas it is connected to the first signal input terminal 1 in FIG. 1.

The circuits operate in the same manner as that of the first exemplary embodiment, in the case of recording the component video signal, and description of which will therefore be skipped.

In the case of recording the composite video signal, the composite video signal is input to the second signal input terminal 2. The signal switching control circuit 4 is operated to select input signals on the "B" side input terminals of the first through the third switching devices 7 through 9, and the "B" side output terminal of the input signal switching device 28.

The video signal recording circuit 10 receives the luminance signal "CY" output by the YC separation circuit 5, and the first color difference signal "CC1" and the second color difference signal "CC2" output by the color difference decoder circuit 6, and records the signals in the recording medium.

As has been described, the video signal recording and reproduction device of this exemplary embodiment desirably may need only three in number of the input terminals. The device is thus able to receive the video signal with a smaller number of the input terminals as compared to the four terminals needed by the conventional device, so as to provide an advantage of reducing a number of signal cables within the device.

According to the foregoing teaching of the first and the second exemplary embodiments, another circuit can be devised in a such structure that the common terminal of the input signal switching device 28 is connected to the third signal input terminal 3, and the composite video signal is input to the third signal input terminal 3.

As described above, any one of the plurality of input terminals for the component video signal can be used commonly as an input terminal for the composite video signal, in the video device of the present invention, which is capable of receiving inputs of both the component video signal and the composite video signal.

Third Exemplary Embodiment

A video signal recording and reproduction device of a third exemplary embodiment of the present invention will be described hereinafter by referring to a block diagram of FIG. 3.

In FIG. 1 depicting the first exemplary embodiment, an input impedance of the YC separation circuit 5 connected to the input signal switching device 28 is substantially high as compared to a line impedance connected to it. Therefore, in the case that video signal is the component video signal, a signal on a line connected from the first signal input terminal 1 to the first switching device 7, i.e. the component luminance signal, is not influenced by the YC separation circuit 5, even if the YC separation circuit 5 is connected to the line. Or, the effect is generally small enough to be negligible. Accordingly, it stands to reason that the input signal switching device 28 shown in FIG. 1 and FIG. 2 can be omitted.

Figure 3:
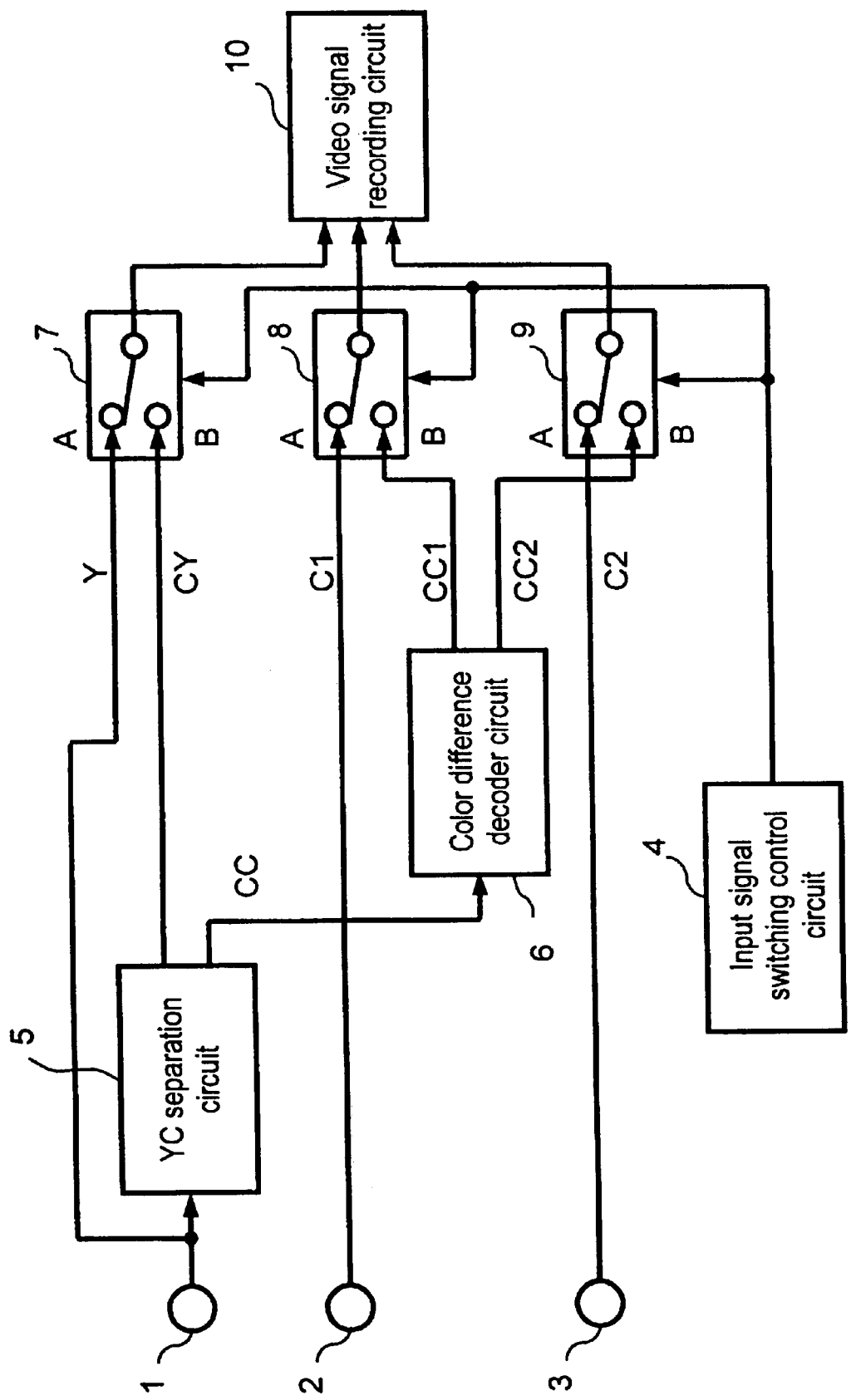
FIG. 3 is a block diagram depicting a video signal recording and reproduction device of a third exemplary embodiment of the present invention.

FIG. 3 differs from FIG. 1 in a respect that the input signal switching device 28 is omitted in it. The device is composed of the same structural elements other than the above, and all connections among the individual structural elements are the same except for those related to the input signal switching device 28. In other words, in the video signal recording and reproduction device depicted in FIG. 3, the first signal input terminal 1 is connected directly to an input terminal of the YC separation circuit 5 without communicating through the input signal switching device 28, while the same first signal input terminal 1 is also connected to the "A" side input terminal of the first switching device 7. In FIG. 3, the same structural elements having the same operational function as those of FIG. 1 are assigned the same reference numerals. Further description about how the device of this exemplary embodiment operates will be omitted.

The video signal recording and reproduction device of this exemplary embodiment desirably may need only three input terminals. The device is thus able to receive the video signal with a smaller number of the input terminals as compared to the four terminals needed by the conventional device, so as to provide an advantage of reducing a number of signal cables within the device. Furthermore, the device has merit in avoiding use of the input signal switching device 28, as compared to that of the first exemplary embodiment.

Fourth Exemplary Embodiment

Figure 4:
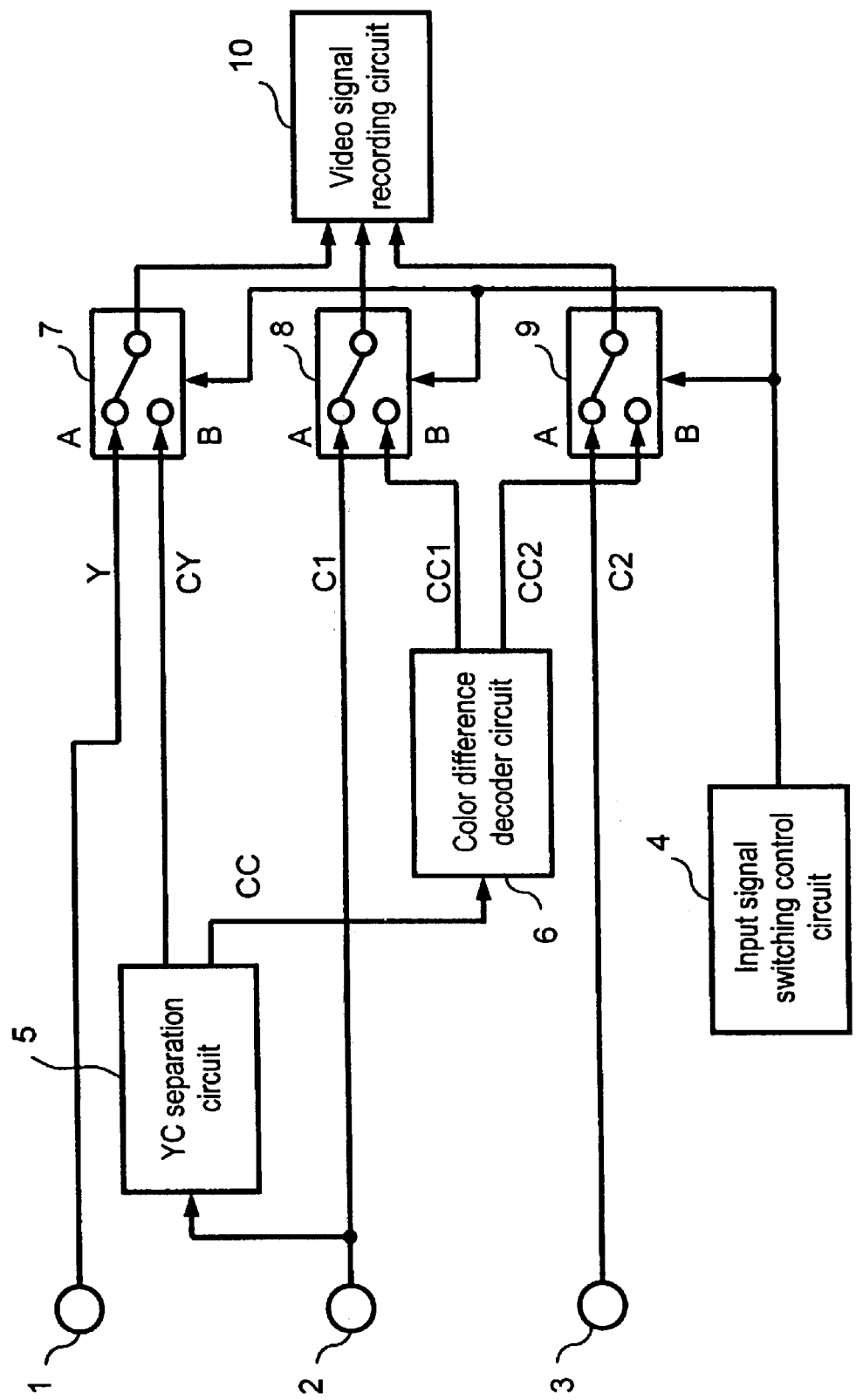
FIG. 4 is a block diagram depicting a video signal recording and reproduction device of a fourth exemplary embodiment of the present invention.

A video signal recording and reproduction device of a fourth exemplary embodiment of the present invention will be described hereinafter by referring to a block diagram of FIG. 4.

Figure 2:
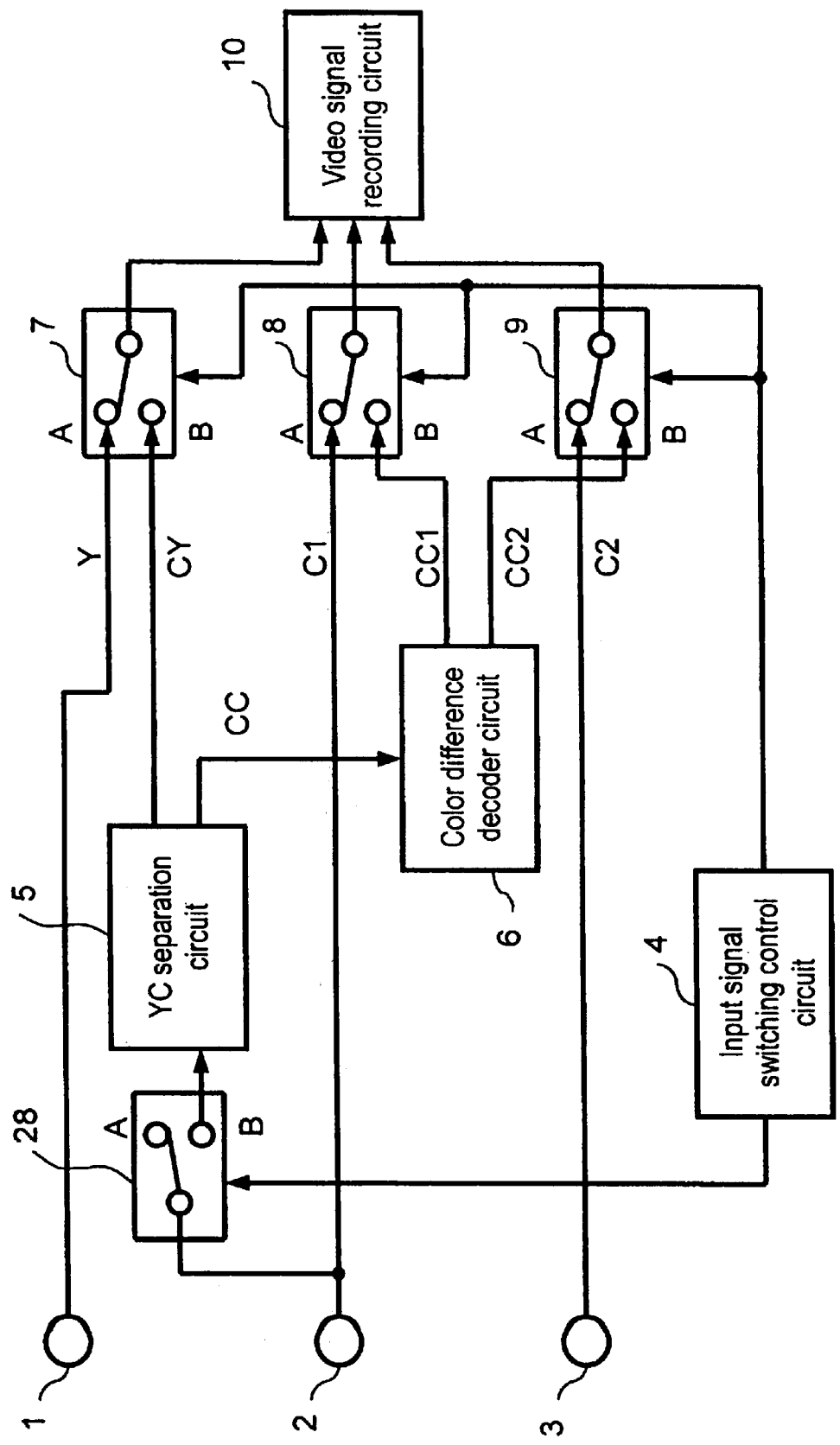
FIG. 2 is a block diagram depicting a video signal recording and reproduction device of a second exemplary embodiment of the present invention.

The video signal recording and reproduction device of this exemplary embodiment is composed of the same structural elements as that of FIG. 2 except that the input signal switching device 28 is omitted. All connections among the individual structural elements are identical except for those related to the input signal switching device 28. That is, in the video signal recording and reproduction device as depicted in FIG. 4, the second signal input terminal 2 is connected to an input terminal of the YC separation circuit 5, while it is also connected to the "A" side input terminal of the second switching device 8. In FIG. 4, the same structural elements having the same operational function as those of FIG. 2 are assigned the same reference numerals. Further description about how the device of this exemplary embodiment operates will be omitted, as it is obvious through the foregoing details.

The video signal recording and reproduction device of this exemplary embodiment desirably may need only three in number of the input terminals, thereby giving an advantage of reducing a number of signal cables within the device. Furthermore, the device provides merit in avoiding use of the input signal switching device 28, as compared to that of the second exemplary embodiment.

According to the above-described third and fourth exemplary embodiments, another circuit can be composed in the same manner so that the composite video signal is input to the third signal input terminal 3.

Fifth Exemplary Embodiment

A video signal recording and reproduction device of a fifth exemplary embodiment of the present invention will be described hereinafter by referring to a block diagram of FIG. 5. The video signal recording and reproduction device of FIG. 5 differs from that of FIG. 1 in a respect that the second switching device 8 and the third switching device 9 are omitted in it. The same structural elements having the same operational function as those of FIG. 1 are assigned the same reference numerals.

An output impedance of the terminal for outputting the first color difference signal "CC1" and an output impedance of the terminal for outputting the second color difference signal "CC2" of the color difference decoder circuit 6 are substantially high as compared to impedance of respective lines connected thereto, when no signal is being output. Therefore, the first component color difference signal "C1" input to the second signal input terminal 2 and the second component color difference signal "C2" input to the third signal input terminal 3 are not influenced by the color difference decoder circuit 6.

Figure 5:
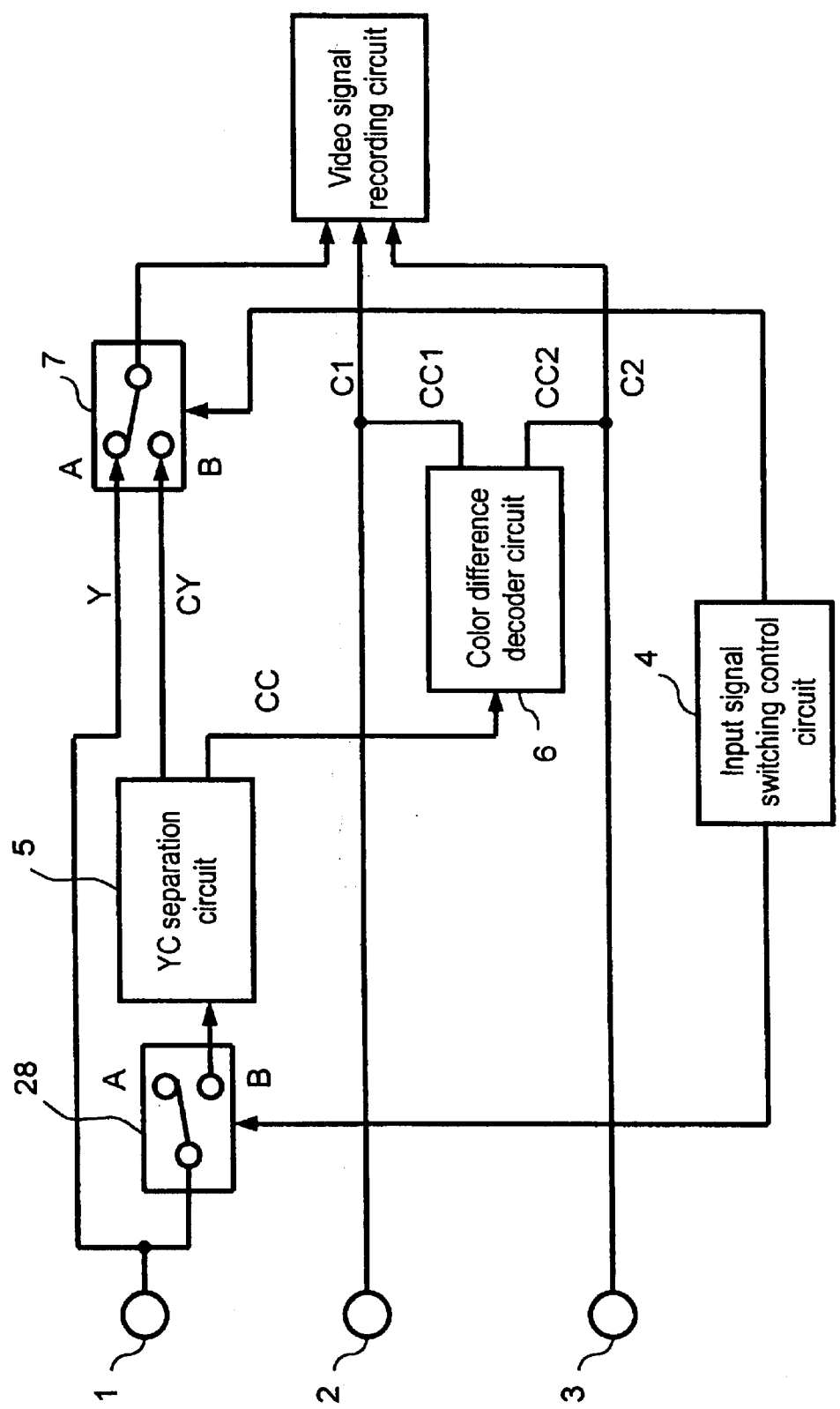
FIG. 5 is a block diagram depicting a video signal recording and reproduction device of a fifth exemplary embodiment of the present invention.

The color difference decoder circuit 6 gives no effect or a negligible effect to the first component color difference signal "C1" and the second component color difference signal "C2", even if the output terminal for the first color difference signal and the output terminal for the second color difference signal of the color difference decoder circuit 6 are connected respectively to the second signal input terminal and the third signal input terminal, as shown in FIG. 5, so long as no input signal is present in the color difference decoder circuit 6.

The video signal recording and reproduction device of this exemplary embodiment requires only three in number of the input terminals, thereby giving an advantage of reducing a number of signal cables within the device. Furthermore, the device provides merit in avoiding use of the switching devices 8 and 9, as compared to the first exemplary embodiment.

Sixth Exemplary Embodiment

Figure 6:
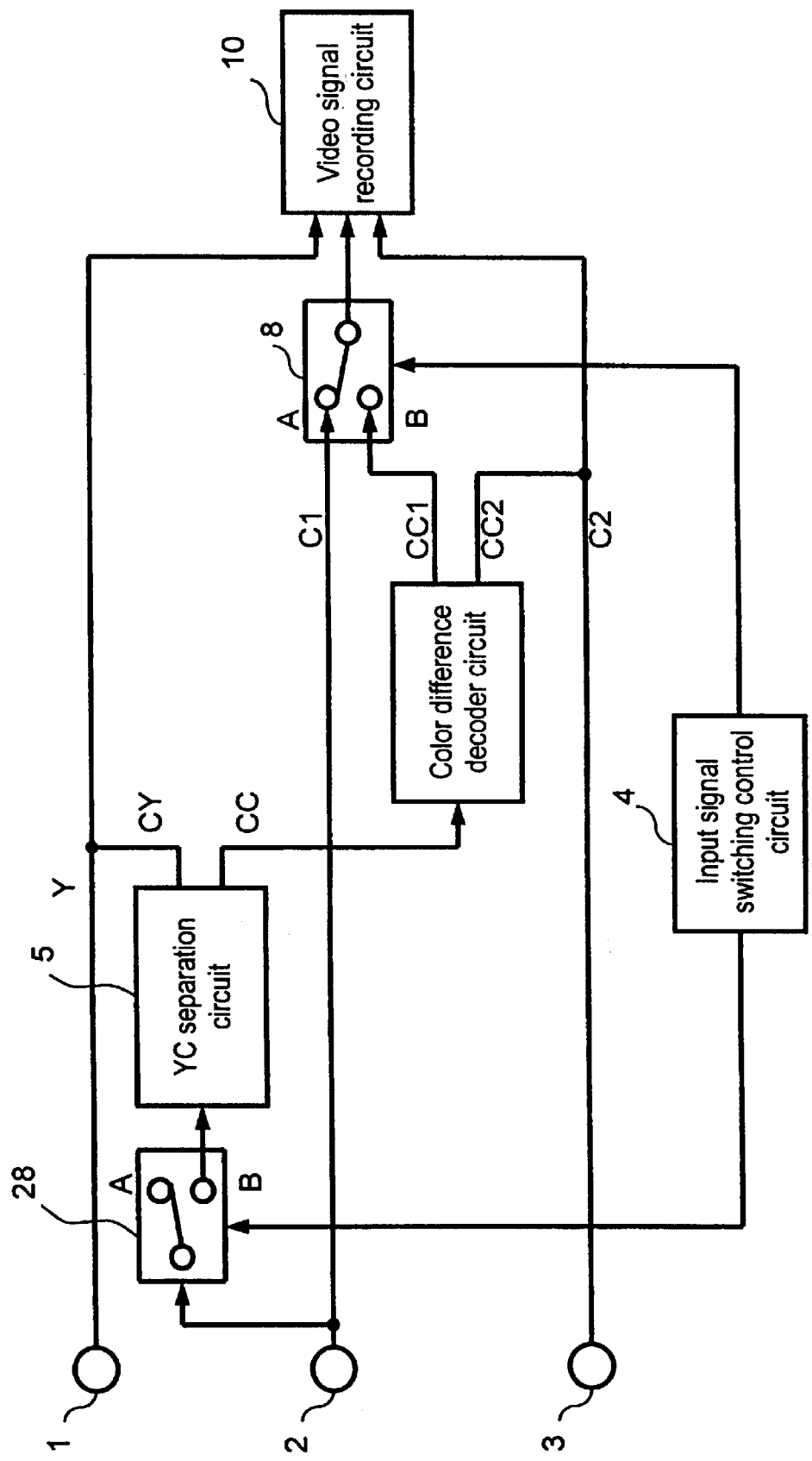
FIG. 6 is a block diagram depicting a video signal recording and reproduction device of a sixth exemplary embodiment of the present invention.

A video signal recording and reproduction device of a sixth exemplary embodiment of the present invention will be described hereinafter by referring to a block diagram of FIG. 6. The video signal recording and reproduction device of this exemplary embodiment has a circuit structure in which the first switching device 7 and the third switching device 9 are eliminated from that of FIG. 2. The same structural elements having the same operational function as those of FIG. 2 are assigned the same reference numerals.

Output impedance of the YC separation circuit 5 is substantially high as compared to impedance of a line connected to it, when no signal is being output. Therefore, the component luminance signal input from the first signal input terminal 1 is not influenced by the presence of the YC separation circuit 5.

The video signal recording and reproduction device of this exemplary embodiment desirably may need only three in number of the input terminals, thereby giving an advantage of reducing a number of signal cables within the device. Furthermore, the device provides merit in avoiding use of the switching devices 7 and 9, as compared to the second exemplary embodiment.

According to the foregoing fifth and sixth exemplary embodiments, another circuit can be composed in the same manner so that the composite video signal may be input to the third signal input terminal 3.

Seventh Exemplary Embodiment

Figure 7:
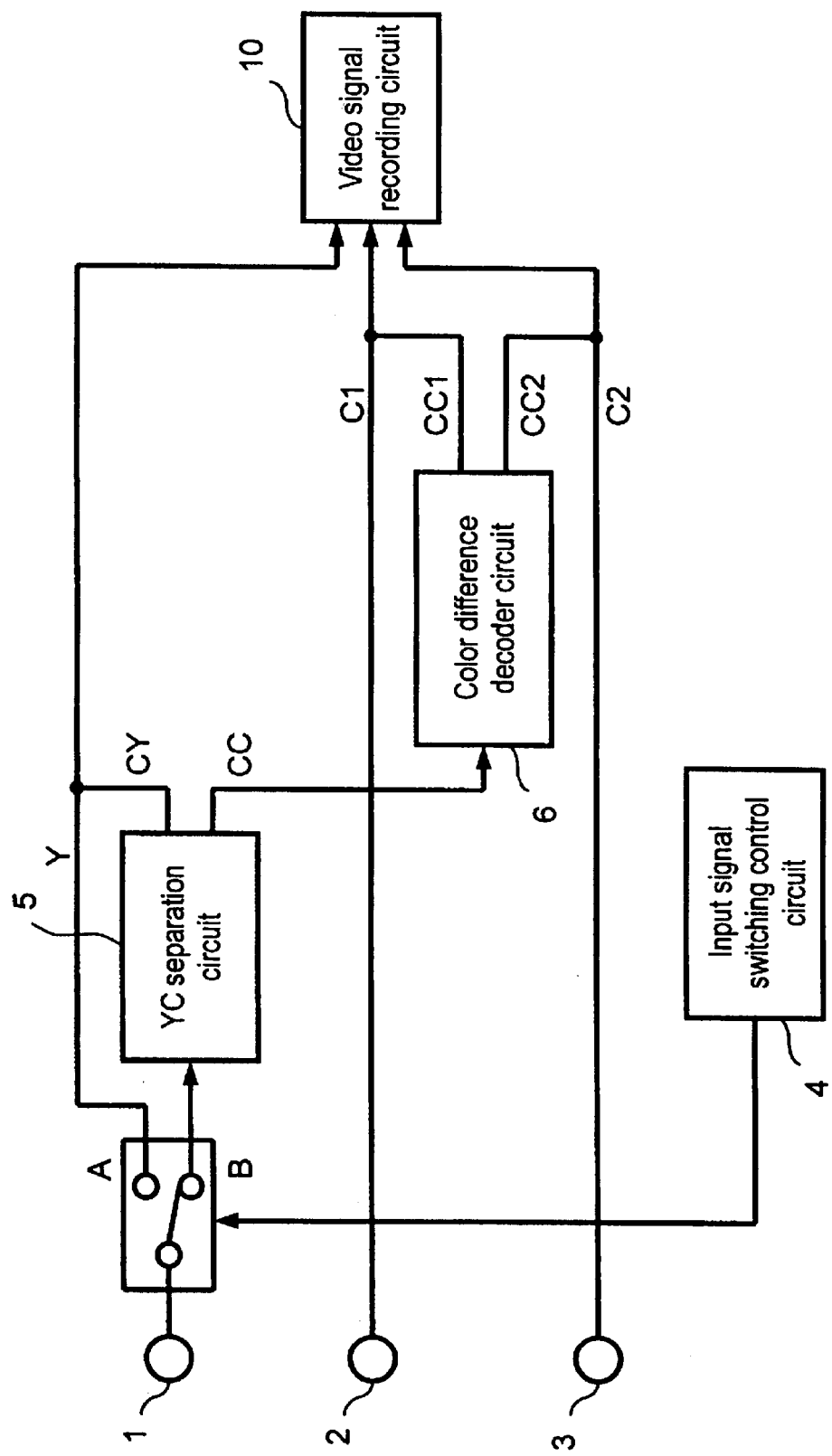
FIG. 7 is a block diagram depicting a video signal recording and reproduction device of a seventh exemplary embodiment of the present invention.

A video signal recording and reproduction device of a seventh exemplary embodiment of the present invention will be described hereinafter by referring to a block diagram of FIG. 7. The video signal recording and reproduction device of this exemplary embodiment has a structure in which the first switching device 7, the second switching device 8 and the third switching device 9 are eliminated from that of FIG. 1. Any structural elements having the same operational function as those of FIG. 1 are assigned the same reference numerals.

As has been described, an output impedance of the YC separation circuit 5 and an output impedance of the color difference decoder circuit 6 are substantially high as compared to impedance of the lines connected to them, when no signal is being output. Therefore, the first switching device 7, the second switching device 8 and the third switching device 9 can be omitted from the structure of FIG. 1.

The video signal recording and reproduction device of this exemplary embodiment desirably may need only three in number of the input terminals, thereby giving an advantage of reducing a number of signal cables within the device. Furthermore, the device provides merit in avoiding use of the switching devices 7, 8 and 9, as compared to the first exemplary embodiment.

Eighth Exemplary Embodiment

Figure 8:
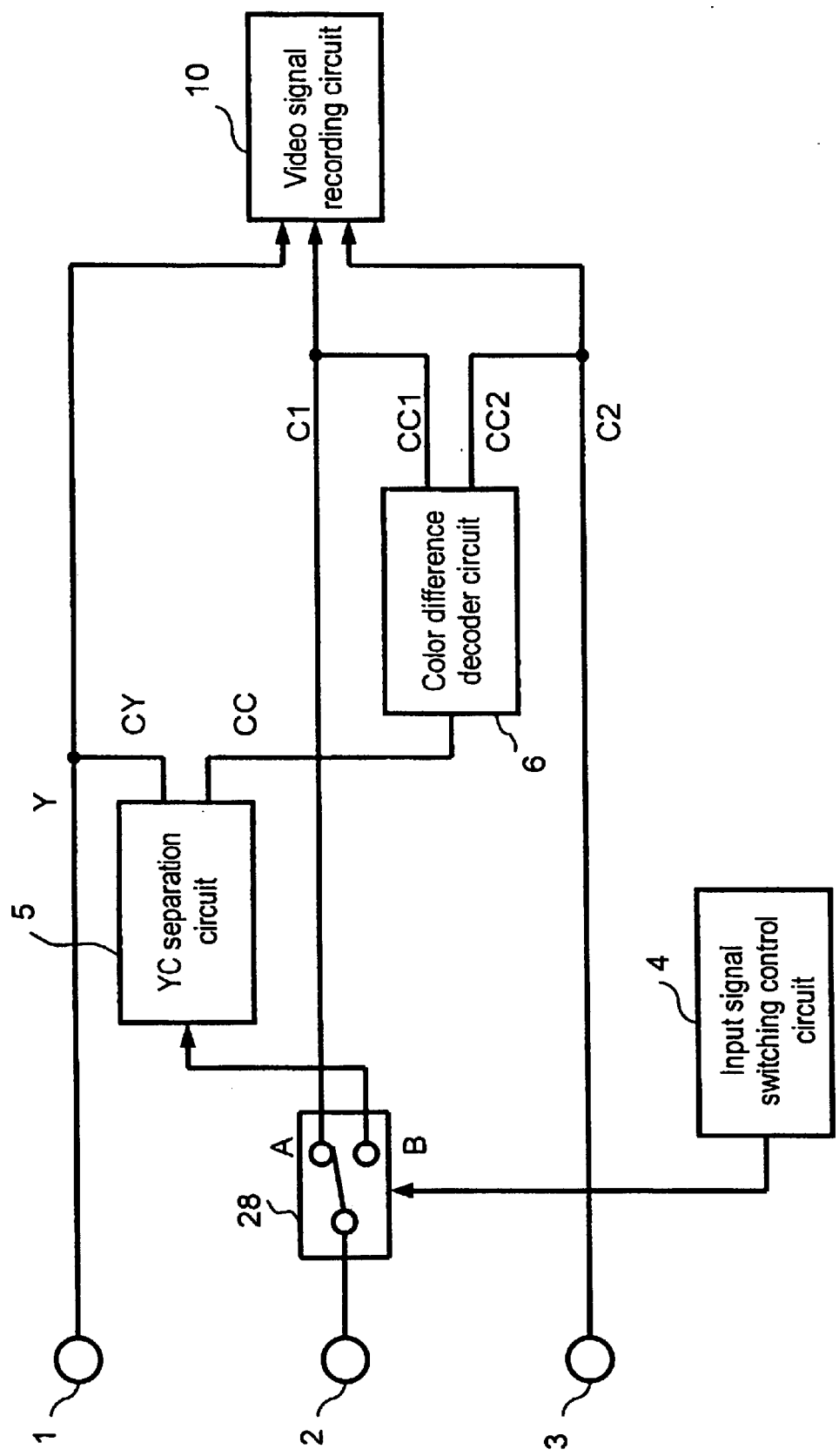
FIG. 8 is a block diagram depicting a video signal recording and reproduction device of an eighth exemplary embodiment of the present invention.

A video signal recording and reproduction device of an eighth exemplary embodiment of the present invention will be described hereinafter by referring to a block diagram of FIG. 8. The video signal recording and reproduction device of this exemplary embodiment has a structure in which the first switching device 7, the second switching device 8 and the third switching device 9 are eliminated from that of FIG. 2. Any structural elements having the same operational function as those of FIG. 2 are assigned the same reference numerals.

As has been described, output impedance of the YC separation circuit 5 and the color difference decoder circuit 6 are substantially high as compared to impedance of the lines connected to them, when no signal is being output. Therefore, the first switching device 7, the second switching device 8 and the third switching device 9 can be omitted from the structure of FIG. 1.

The video signal recording and reproduction device of this exemplary embodiment desirably may need only three in number of the input terminals, thereby giving an advantage of reducing a number of signal cables within the device. Furthermore, the device provides merit in avoiding use of the switching devices 7, 8 and 9, as compared to the second exemplary embodiment.

According to the foregoing seventh and eighth exemplary embodiments, it is needless to note that another circuit can be composed in the same manner so that the composite video signal may be input to the third signal input terminal 3.

Ninth Exemplary Embodiment

Figure 9:
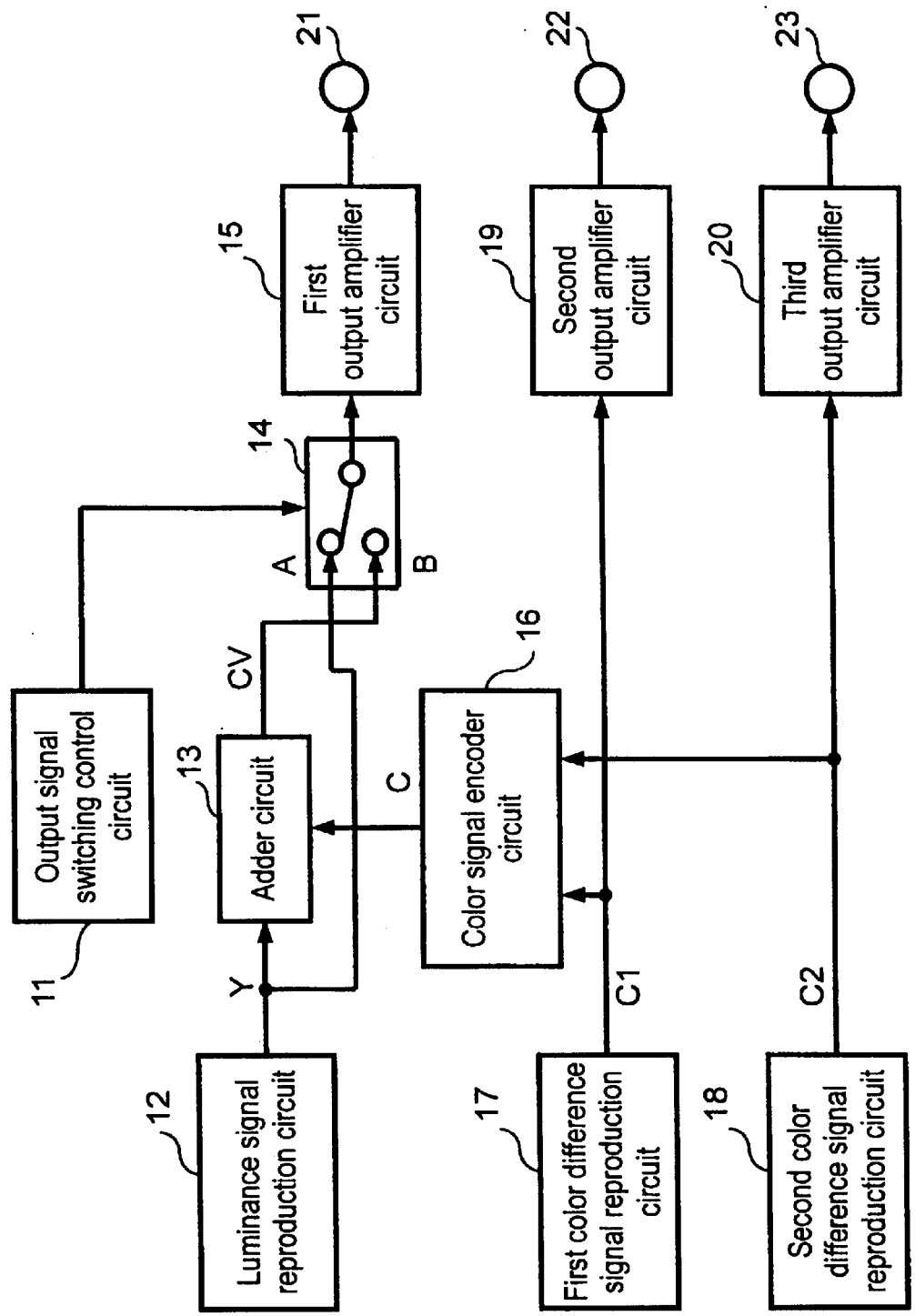
FIG. 9 is a block diagram depicting a video signal recording and reproduction device of a ninth exemplary embodiment of the present invention.

A video signal recording and reproduction device of a ninth exemplary embodiment of the present invention will be described hereinafter by referring to a block diagram of FIG. 9.

A luminance signal reproduction circuit 12 reproduces a luminance signal "Y" from a recording medium. A first color difference signal reproduction circuit 17 reproduces a first color difference signal "C1" from the recording medium. A second color difference signal reproduction circuit 18 reproduces a second color difference signal "C2" from the recording medium. A color signal encoder circuit 16 receives inputs of the first color difference signal "C1" output by the first color difference signal reproduction circuit 17 and the second color difference signal "C2" output by the second color difference signal reproduction circuit 18, generates a carrier color signal "C", and outputs it to an adder circuit 13. The adder circuit 13 generates and outputs a composite video signal CV by adding the luminance signal "Y" output by the luminance signal reproduction circuit 12 and the carrier color signal "C" output by the color signal encoder circuit 16.

A switching device 14 receives an output Y of the luminance signal reproduction circuit 12 at an "A" side terminal and an output CV of the adder circuit 13 at an "B" side terminal, and outputs either one of the signals by selecting it. A first output amplifier circuit 15 amplifies the output of the switching device 14, and outputs it to a video signal output terminal 21. The video signal output terminal 21 outputs the output signal of the first output amplifier circuit 15 from the video signal recording and reproduction device. A second output amplifier circuit 19 amplifies the output signal C1 of the first color difference signal reproduction circuit 17. A first color difference signal output terminal 22 outputs the output signal of the second output amplifier circuit 19 from the video signal recording and reproduction device. A third output amplifier circuit 20 amplifies the output signal C2 of the second color difference signal reproduction circuit 18. A second color difference signal output terminal 23 outputs the output signal produced by the third output amplifier circuit 20 from the video signal recording and reproduction device. An output signal switching control circuit 11 switches the signal output from the video signal output terminal 21 by controlling the switching device 14.

Described hereinafter is a case in which a component video signal is output from the video signal recording and reproduction device of this exemplary embodiment. The output signal switching control circuit 11 is operated to select the "A" side input terminal of the fifth switching device 14. A component luminance signal "Y" is output from the video signal output terminal 21. The first color difference signal "C1" output by the first color difference signal reproduction circuit 17 passes through the second output amplifier circuit 19, and is output from the first color difference signal output terminal 22, as a first component color difference signal. In the like manner, the second component color difference signal "C2" is output by the second color difference signal reproduction circuit 18, passes through the third output amplifier circuit 20, and is output from the second color difference signal output terminal 23.

Described next is a case in which a composite video signal is output from the video signal recording and reproduction device of this exemplary embodiment. The output signal switching control circuit 11 is operated to select the "B" side input terminal of the switching device 14. The color signal encoder circuit 16 receives inputs of the first color difference signal "C1" output by the first color difference signal reproduction circuit 17 and the second color difference signal "C2" output by the second color difference signal reproduction circuit 18, converts them into a carrier color signal "C", and outputs it to the adder circuit 13. The adder circuit 13 generates and outputs a composite video signal "CV" by adding the luminance signal "Y" output by the luminance signal reproduction circuit 12 and the carrier color signal "C" output by the color signal encoder circuit 16. The composite video signal "CV" generated here passes through the fifth switching device 14 and the first output amplifier circuit 15, and is output from the video signal output terminal 21.

From the foregoing, it will be seen that the video signal recording and reproduction device of this exemplary embodiment makes use of the video signal output terminal 21 as a component luminance signal output terminal when it outputs a component video signal, or, as a composite video signal output terminal when it outputs a composite video signal.

In other words, the video signal recording and reproduction device of this exemplary embodiment unifies the component luminance signal output terminal and the composite video signal output terminal.

As has been described, the video signal recording and reproduction device of this exemplary embodiment desirably may need only three in number of the output terminals. Thus, the device is able to output the video signal with a smaller number of the output terminals than the conventional four terminals, so as to provide an advantage of reducing a number of signal cables and a number of output amplifier circuits in the device.

Tenth Exemplary Embodiment

Figure 10:
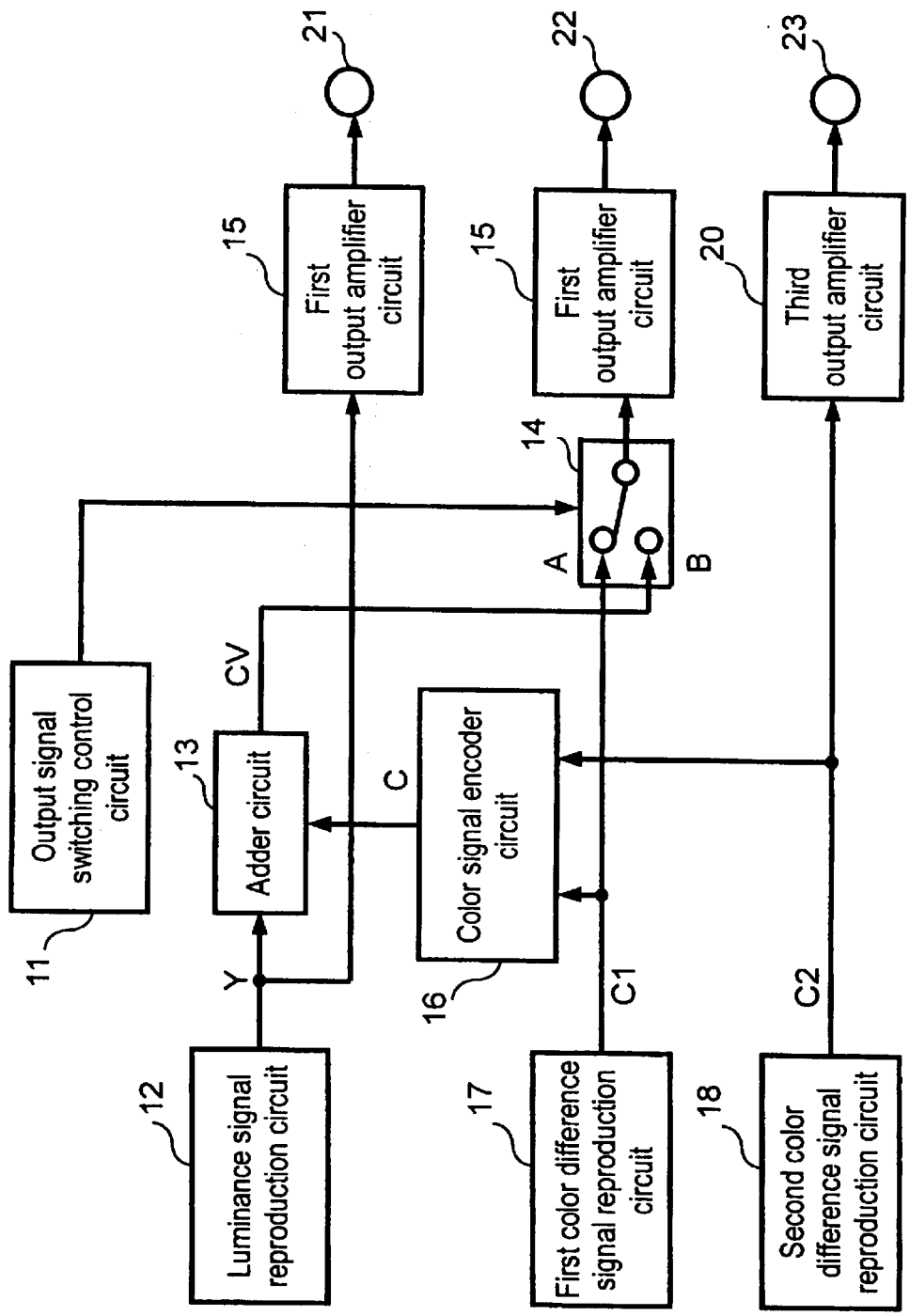
FIG. 10 is a block diagram depicting a video signal recording and reproduction device of a tenth exemplary embodiment of the present invention.

A video signal recording and reproduction device of a tenth exemplary embodiment of the present invention will be described hereinafter by referring to a block diagram of FIG. 10.

The video signal recording and reproduction device of this exemplary embodiment differs from that of the ninth exemplary embodiment in a respect that an output C1 of the first color difference signal reproduction circuit 17 is connected to the "A" side input terminal of the switching device 14, an output CV of the adder circuit 13 is connected to the "B" side input terminal, and an input terminal of the second output amplifier circuit 19 is connected to a common terminal of the switching device 14.

In this exemplary embodiment, the video signal output terminal 22 is utilized as a first component color difference signal output terminal when the video signal output terminal 22 outputs a component video signal. Also, the video signal output terminal 22 is utilized as a composite video signal output terminal when the video signal output terminal 22 outputs a composite video signal.

The video signal recording and reproduction device of this exemplary embodiment operates in the same manner as that of the ninth exemplary embodiment, and description of which will therefore be skipped. The video signal recording and reproduction device of this exemplary embodiment requires only three in number of the output terminals. Thus, the device is able to output the video signal with a smaller number of the output terminals than the conventional four terminals, so as to provide an advantage of reducing a number of signal cables and a number of output amplifier circuits in the device.

Based on the foregoing ninth and the tenth exemplary embodiments, another circuit can be devised in such a structure that an output of the second color difference signal reproduction circuit 18 is connected to the "A" side input terminal of the switching device 14, an output of the adder circuit 13 is connected to the "B" side input terminal, and the input terminal of the third output amplifier circuit 20 is connected to the common terminal of the switching device 14.

Eleventh Exemplary Embodiment

A video signal recording and reproduction device of an eleventh exemplary embodiment of the present invention will be described hereinafter by referring to a block diagram of FIG. 11.

Figure 11:
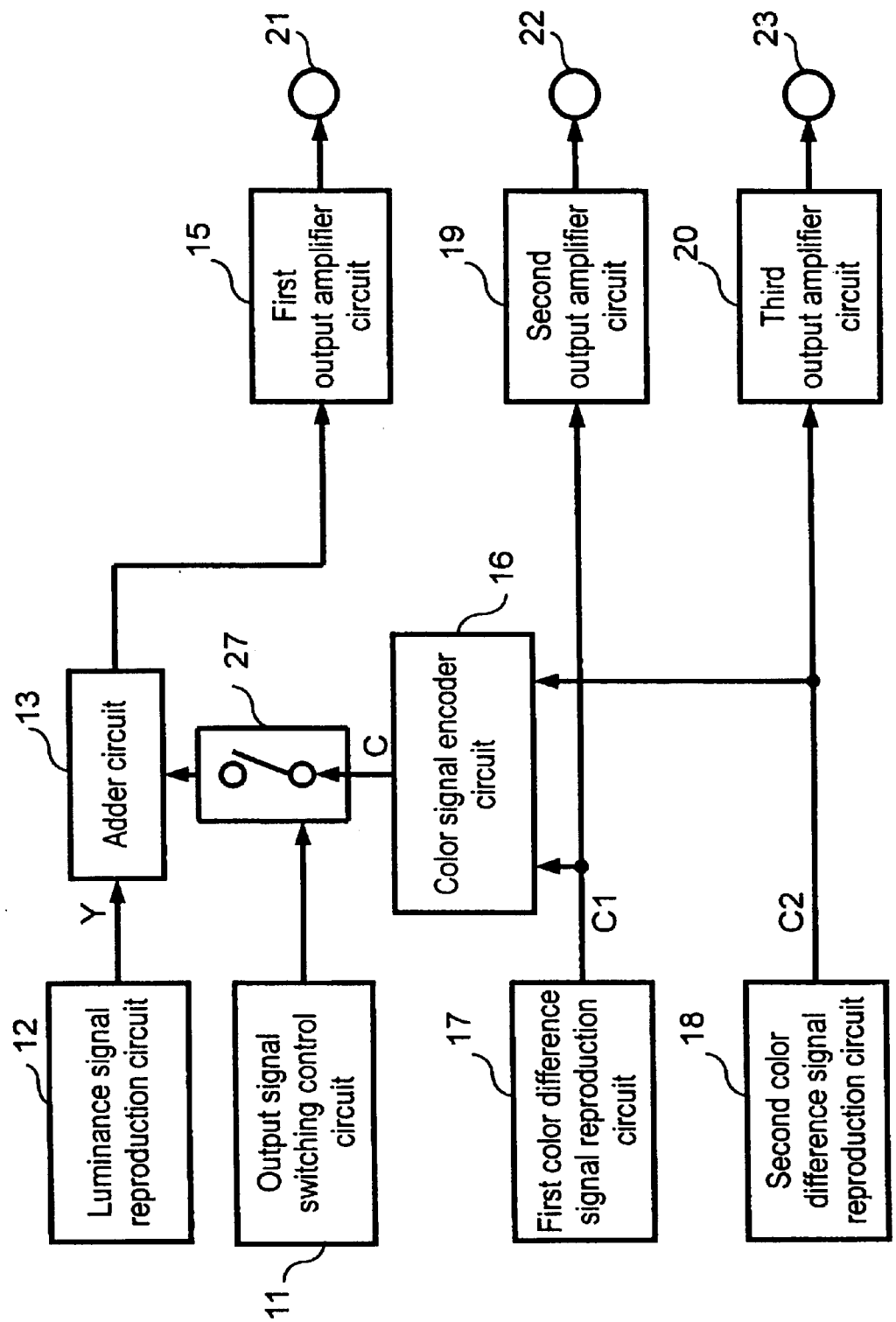
FIG. 11 is a block diagram depicting a video signal recording and reproduction device of an eleventh exemplary embodiment of the present invention.

In FIG. 11, all of the structural elements, except for a switch 27, are identical to those of the ninth exemplary embodiment. Since the structural elements carrying the same reference numerals operate in the same manner, their description will be skipped.

Described hereinafter is a case in that a composite video signal is output. The output signal switching control circuit 11 is operated to turn on the switch 27. The adder circuit 13 generates a composite video signal by adding a luminance signal "Y" output by the luminance signal reproduction circuit 12 and a carrier color signal "C" output by the color signal encoder circuit 16. The composite video signal is amplified by the first output amplifier circuit 15, and is output from the video signal output terminal 21.

Described now is a case in which a component video signal is output. The output signal switching control circuit 11 is operated to turn off the switch 27. Since the carrier color signal is not supplied to the adder circuit 13, the output signal from the luminance signal reproduction circuit 12 passes through the adder circuit 13 without being added up, and is output as the component luminance signal from the video signal output terminal 21, after amplified by the first output amplifier circuit 15.

A first component color difference signal "C1" is output from the first color difference signal reproduction circuit 17, amplified by the second output amplifier circuit 19, and is then output from the first color difference signal output terminal 22.

In like manner, a second component color difference signal "C2" is output by the second color difference signal reproduction circuit 18, amplified by the third output amplifier circuit 20, and is output from the second color difference signal output terminal 23.

The video signal recording and reproduction device of this exemplary embodiment requires only three in number of the output terminals. Thus, the device is able to output the video signal with a smaller number of the output terminals as compared to the conventional four terminals, thereby having an advantage of reducing a number of signal cables and a number of output amplifier circuits in the device.

Twelfth Exemplary Embodiment

A video signal recording and reproduction device of a twelfth exemplary embodiment of the present invention will be described hereinafter by referring to a block diagram of FIG. 12.

Figure 12:
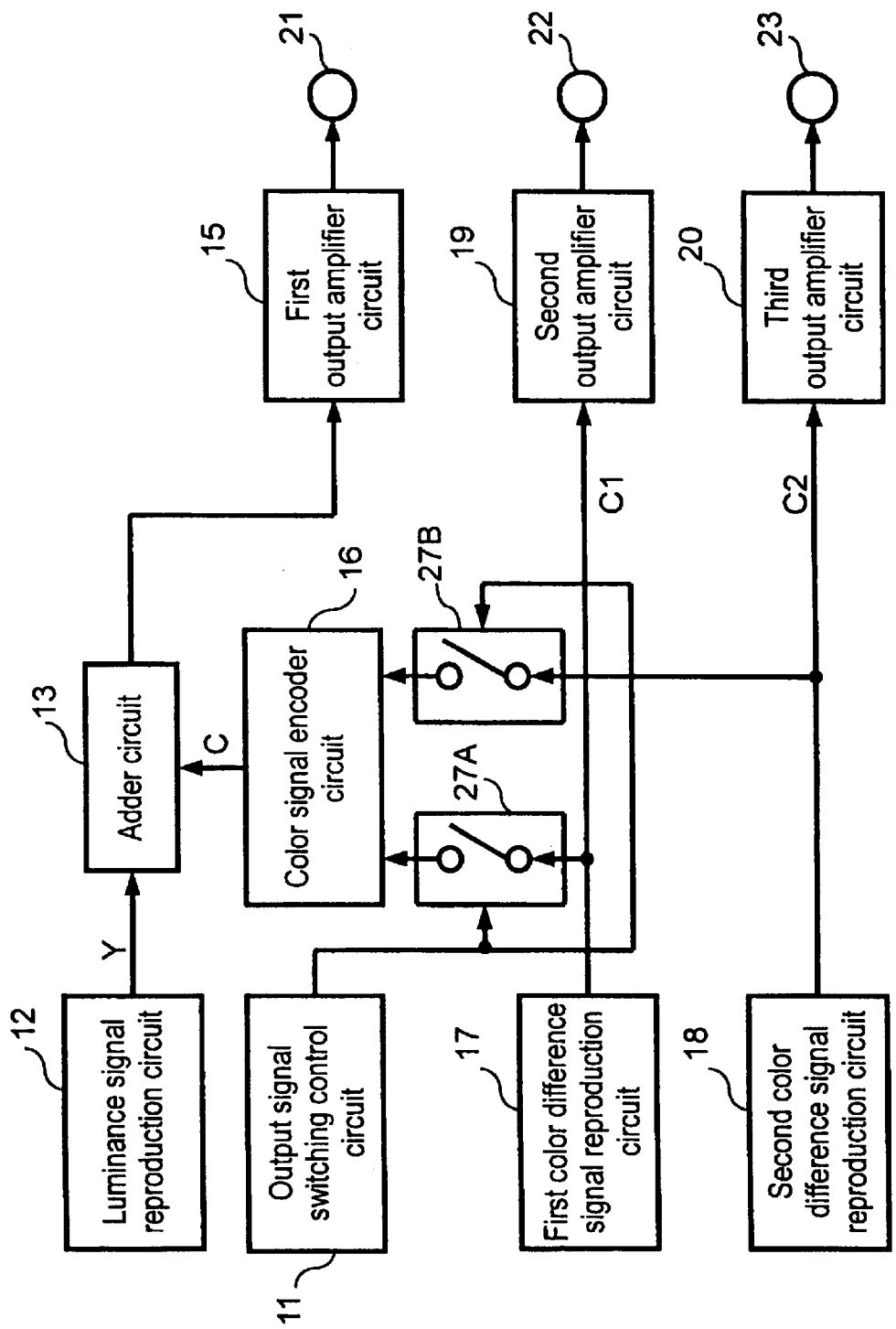
FIG. 12 is a block diagram depicting a video signal recording and reproduction device of a twelfth exemplary embodiment of the present invention.
Figure 13:
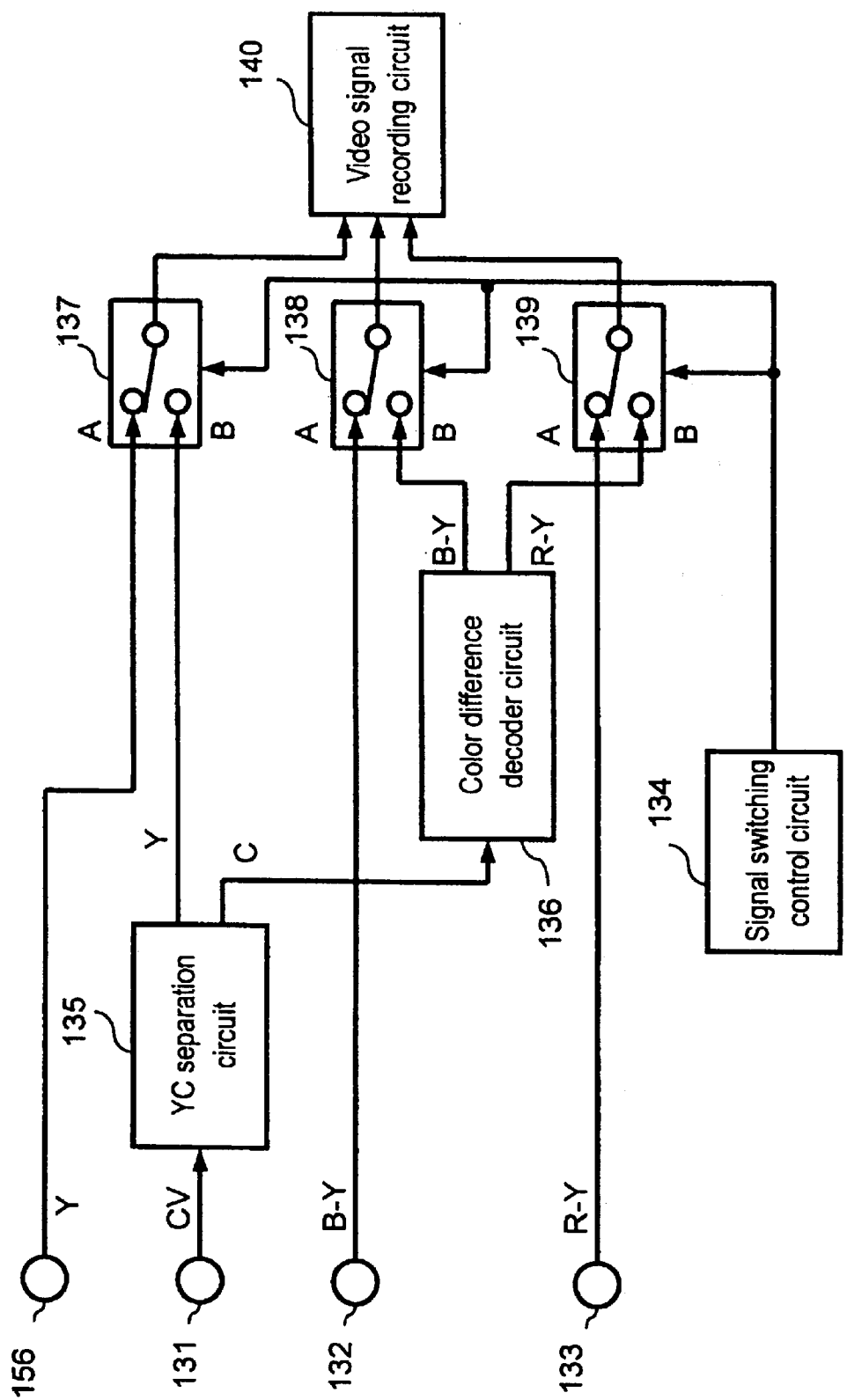
FIG. 13 is a block diagram depicting a video signal recording and reproduction device of the prior art.
Figure 14:
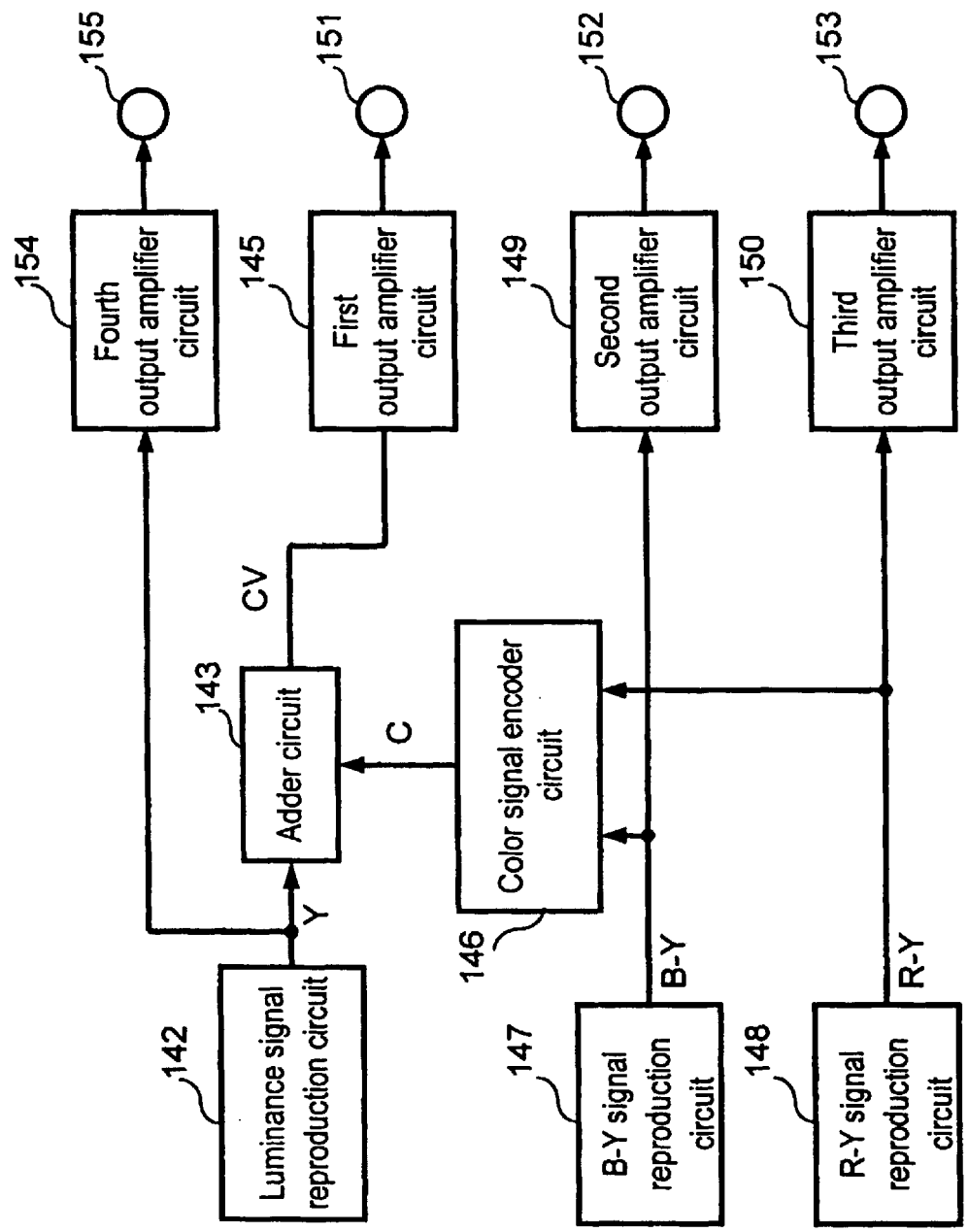
FIG. 14 is a further block diagram relating to a video signal recording and reproduction device of the prior art.

The video signal recording and reproduction device of this exemplary embodiment differs from that of the eleventh exemplary embodiment in a respect that two switches 27*a* and 27*b* are provided at an input side of the color difference encoder circuit in FIG. 12, whereas the switch 27 is provided at an output side of the color difference encoder circuit in FIG. 11. All of the other structural elements are identical to those of the tenth exemplary embodiment. Since the structural elements carrying the same reference numerals operate in the same manner, their description will be skipped.

Described hereinafter is a case in that a composite video signal is output. The output signal switching control circuit 11 is operated to turn on the switches 27*a* and 27*b*. The adder circuit 13 generates a composite video signal by adding a luminance signal "Y" output by the luminance signal reproduction circuit 12 and a carrier color signal "C" output by the color signal encoder circuit 16. The composite video signal is amplified by the first output amplifier circuit 15, and is output from the video signal output terminal 21.

Described now is a case in which a component video signal is output. The output signal switching control circuit 11 is operated to turn off the switches 27*a* and 27*b*. Since the carrier color signal is not supplied to the adder circuit 13, the output signal from the luminance signal reproduction circuit 12 passes through the adder circuit 13 without being added up, and it is output as being the component luminance signal from the video signal output terminal 21, after amplified by the first output amplifier circuit 15.

A first component color difference signal "C1" is output from the first color difference signal reproduction circuit 17, amplified by the second output amplifier circuit 19, and is then output from the first color difference signal output terminal 22.

In like manner, a second component color difference signal "C2" is output by the second color difference signal reproduction circuit 18, amplified by the third output amplifier circuit 20, and is output from the second color difference signal output terminal 23.

The video signal recording and reproduction device of this exemplary embodiment requires only three in number of the output terminals. Thus, the device is able to output the video signal with a smaller number of the output terminals as compared to the conventional four terminals, thereby having an advantage of reducing a number of signal cables and a number of output amplifier circuits in the device.

As has been described, the present invention provide an expedient advantage of making a video signal recording and reproduction device capable of inputting and outputting both component video signal and composite video signal with a reduced number of input/output connectors, thereby realizing a reduction in size, a reduction in cost, as well as a reduction of power consumption.

In addition, the device provides even greater effectiveness, when it employs a combination of any of the switching schemes for video input signal described in the first through eighth exemplary embodiments, together with another one of the switching schemes for video output signal described in the ninth through twelfth exemplary embodiments.

Although the switching schemes for output signal described in the ninth through twelfth exemplary embodiments have been represented by the video signal recording and reproduction device, they are adaptable to video signal reproduction devices not equipped with a recording function.

Although the foregoing exemplary embodiments have been described in the structure of hardware circuits, all or a part of the function of the structural elements can be realized by a software, except for the terminals. Furthermore, the present invention can be embodied in a variety of modified forms. Accordingly, it should be understood that all modifications falling within the true spirit and scope of this invention are covered by the appended claims.

What is claimed is:

1. A video signal recording and reproduction device comprising:

a first signal input terminal for inputting a luminance signal;

a second signal input terminal for inputting a first color difference signal;

a third signal input terminal for inputting a second color difference signal;

YC separation means for separating and outputting another luminance signal and a carrier color signal from a composite video signal; and color difference decoding means for inputting said carrier color signal output from said YC separation means, and decoding and outputting another first color difference signal and another second color difference signal;

input signal switching means provided between one terminal selected from said first signal input terminal, said second signal input terminal and said third signal input terminal, said one terminal used for receiving said composite video signal for said YC separation means;

switching means for inputting a component video signal input in said one terminal used for receiving said composite video signal and one of an output signal of said YC separation means and an output signal of said color difference decoding means, and outputting one of the signals input therein; and signal switching control means for outputting a signal for switching said input signal switching means and said switching means.

2. A video signal recording and reproduction device comprising:

a first signal input terminal for inputting a luminance signal;

a second signal input terminal for inputting a first color difference signal;

a third signal input terminal for inputting a second color difference signal;

YC separation means for separating another luminance signal and a carrier color signal from a composite video signal, and outputting said separated signals; and color difference decoding means for inputting said carrier color signal output by said YC separation means, and decoding and outputting another first color difference signal and another second color difference signal;

input signal switching means for outputting a signal input in one terminal used for receiving said composite video signal input terminal, to one of said YC separation means, said one terminal is selected from said first signal input terminal, said second signal input terminal and said third signal input terminal; and signal switching control means for outputting a signal for switching said input signal switching means.

3. A video signal reproduction device comprising:

luminance signal reproduction means for reproducing a luminance signal from a recording medium;

first color difference signal reproduction means for reproducing a first color difference signal from the recording medium;

second color difference signal reproduction means for reproducing a second color difference signal from the recording medium;

color signal encoding means for converting said first color difference signal output from said first color difference signal reproduction means and said second color difference signal output from said second color difference signal reproduction means into a carrier color signal;

adding means for adding said luminance signal output from said luminance signal reproduction means and said carrier color signal output from said color signal encoding means, and outputting a composite video signal;

a luminance signal output terminal for outputting both said luminance signal and said composite video signal, switching means for inputting an output of said adding means and an output signal from among said luminance signal reproduction means, said first color difference signal reproduction means and said second color difference signal reproduction means, and outputting one of the signals input therein; and output signal switching control means for controlling said switching means.

4. A video signal reproduction device comprising:

luminance signal reproduction means for reproducing a luminance signal from a recording medium;

first color difference signal reproduction means for reproducing a first color difference signal from the recording medium;

second color difference signal reproduction means for reproducing a second color difference signal from the recording medium;

color signal encoding means for converting said first color difference signal output from said first color difference signal reproduction means and said second color difference signal output from said second color difference signal reproduction means into a carrier color signal;

adding means for adding said luminance signal output from said luminance signal reproduction means and said carrier color signal output from said color signal encoding means, and outputting a composite video signal;

a luminance signal output terminal for outputting both said luminance signal and said composite video signal, switching means provided between an output terminal of said color signal encoding means and an input terminal of said adding means for determining whether to add or not to add the carrier color signal of said color signal encoding means; and output signal switching control means for controlling said switching means.

5. A video signal reproduction device comprising:

luminance signal reproduction means for reproducing a luminance signal from a recording medium;

first color difference signal reproduction means for reproducing a first color difference signal from the recording medium;

second color difference signal reproduction means for reproducing a second color difference signal from the recording medium;

color signal encoding means for converting said first color difference signal output from said first color difference signal reproduction means and said second color difference signal output from said second color difference signal reproduction means into a carrier color signal;

adding means for adding said luminance signal output from said luminance signal reproduction means and said carrier color signal output from said color signal encoding means, and outputting a composite video signal;

a luminance signal output terminal for outputting both said luminance signal and said composite video signal, first switching means provided between an output terminal of said first color difference signal reproduction means and an input terminal of said color signal encoding means for turning on and off an output signal of said first color difference signal reproduction means;

second switching means provided between an output terminal of said second color difference signal reproduction means and an input terminal of said color signal encoding means for turning on and off an output signal of said second color difference signal reproduction means; and output signal switching control means for controlling said switching means.

6. A video signal reproduction device further comprising luminance signal reproduction means for reproducing a luminance signal from a recording medium;

first color difference signal reproduction means for reproducing a first color difference signal from the recording medium;

second color difference signal reproduction means for reproducing a second color difference signal from the recording medium;

color signal encoding means for converting said first color difference signal output from said first color difference signal reproduction means and said second color difference signal output from said second color difference signal reproduction means into a carrier color signal;

adding means for adding said luminance signal output from said luminance signal reproduction means and said carrier color signal output from said color signal encoding means, and outputting a composite video signal;

a luminance signal output terminal for outputting both said luminance signal and said composite video signal, and means for controlling whether to add or not to add the carrier color signal output by said color signal encoding means.

* * * * *

UNITED STATES PATENT AND TRADEMARK OFFICE
CERTIFICATE OF CORRECTION

| | | |
|---|---|---|
| PATENT NO. | : 7,242,844 B1 | Page 1 of 1 |
| APPLICATION NO. | : 09/446790 | |
| DATED | : July 10, 2007 | |
| INVENTOR(S) | : Masaji Ueno | |

It is certified that error appears in the above-identified patent and that said Letters Patent is hereby corrected as shown below:

Column 16

Line 39, delete "further"

Signed and Sealed this

Eighteenth Day of December, 2007

JON W. DUDAS
*Director of the United States Patent and Trademark Office*